United States Patent Office.

JOHN R. BROWN, OF OAKLAND, AND JOHN S. BROWN, OF ALAMEDA, CALIFORNIA.

TANNING PROCESS.

SPECIFICATION forming part of Letters Patent No. 625,638, dated May 23, 1899.

Application filed June 20, 1898. Serial No. 683,988. (No specimens.)

*To all whom it may concern:*

Be it known that we, JOHN R. BROWN, of Oakland, and JOHN S. BROWN, of Alameda, county of Alameda, State of California, have invented certain new and useful Improvements in Tanning Processes; and we hereby declare the following to be a full, clear, and exact description of the same.

Our invention relates to the preparation of hides and skins for tanning and to an improved method of treating them during and in connection with what is called "soaking" and "liming" and other operations previous to tanning.

Our improved process consists in what may be called "refrigeration" of the soaking and lime vats and otherwise to maintain the temperature of the hides, water, and solutions near the point of congelation for pure water.

The results attained by our discovery and process are the retention within the hides or skins of their gelatinous matter that contributes to the quality of the finished leather made therefrom, increases its weight, firmness, strength, and endurance, and also intensifies the action of the lime solution in the second stage of treatment.

In carrying out our improved process the hides or skins are placed in soaking-vats, which are then filled with water at a temperature approaching that of congelation, preferably at 38° to 45°, by the Fahrenheit scale, which temperature is maintained by the circulation of artificially-cooled water through the vats, or the vats are cooled by any other suitable means of refrigeration for a period of fifty to one hundred hours, during which time the hides are thoroughly soaked and permeated by the water and the salt dissolved and washed out; but by reason of the maintained low temperature the gelatinous matter is retained. This latter becomes permeated and softened the same as the fibrous substance and remains fixed in a coagulated form up to a temperature of about 70° Fahrenheit, at which point and above, varying with the nature of the hides, the gelatinous substance tends to become dissolved out, leaving the fiber without its natural support. The loss of gelatin also prevents the proper incorporation of tannin or tannic acid in the later process of tanning. After the hides or skins have been thus soaked they are, with as little change of temperature as possible, removed to the lime-vats, where the same conditions are provided, the low temperature being maintained, as before, by artificial means, preferably by circulation of water reduced to a low temperature by suitable refrigerating apparatus. The liming process is continued for a time sufficient to neutralize the animal fat and loosen the hair and permit its removal, usually from one to two hundred hours. The low temperature has also the effect of intensifying the action of the lime and shortening the time required in the lime-vats.

The vats can be erected above or below the earth or insulated therefrom, as the climate or other conditions render desirable, and are preferably so arranged in tiers or rows that the refrigerated water can flow through them in series.

The cold water can be trained to and through the vats, the means employed being of no consequence so long as the temperature in the vats does not rise to a point that dissolves the gelatinous matter in the hides or skins.

In the usual manner of treating hides the soaking and lime vats, being buried in the earth or exposed to the air, assume the surrounding temperature or by certain reactions rise above that, and the temperature consequently often reaches a degree warm enough to begin to dissolve and reduce the gelatinous matter and permit it to leach out of the hides or skins.

We are not able to trace out in chemical terms the result of our improved process in respect to the incorporation of tannin or the increased effect of the lime solution, but know that such effect is desirable and tends to the improvement of the leather; also, it facilitates currying and dressing by reason of a closer texture and firmness of the leather.

Having thus described our invention and the manner of applying the same, what we claim, and desire to secure by Letters Patent, is—

The improved method of treating hides preparatory to tanning, which consists in first soaking the hides in water artificially cooled to a temperature approaching that of congelation, preferably from 38° to 45° Fahrenheit, until thoroughly saturated; then transferring the same without substantial rise of temperature to a solution of lime maintained by artificial means at a similar low degree of temperature, and soaking for a suitable period, whereby the gelatinous matter is conserved and the action of the lime intensified, substantially as specified.

JOHN R. BROWN.
JOHN S. BROWN.

Witnesses:
THOMAS MCMAHON,
H. SANDERSON.